United States Patent [19]

Jauhal et al.

[11] Patent Number: 5,097,909
[45] Date of Patent: Mar. 24, 1992

[54] GARDEN TROWEL TOOL KIT

[76] Inventors: Kuldip S. Jauhal; Bemi K. Jauhal, both of 16290 Jackson Oaks Dr., Morgan Hills, Calif. 95037

[21] Appl. No.: 701,769

[22] Filed: May 17, 1991

[51] Int. Cl.$^5$ ............................................. A01B 1/22
[52] U.S. Cl. ................................... 172/371; 15/235.4; 294/7
[58] Field of Search ................. 294/7, 49, 57; 15/235.4, 235.5, 235.6; 172/371, 372, 373, 374, 375, 380; 16/110 R, 111 R, DIG. 24, DIG. 25, DIG. 12

[56] References Cited

U.S. PATENT DOCUMENTS

| | | | |
|---|---|---|---|
| 737,831 | 9/1903 | Feraud | 15/235.4 |
| 1,099,201 | 6/1914 | Payton | 16/110 R |
| 1,648,324 | 11/1927 | Pratt | 11/192.7 |
| 2,563,255 | 8/1951 | Loomis | 294/7 |
| 2,572,230 | 10/1951 | Williams | 294/57 |
| 4,224,713 | 9/1980 | Trent | 15/235.4 |
| 4,884,312 | 12/1989 | Clark | 15/235.4 |
| 5,014,792 | 5/1991 | Gierloff | 172/371 |
| 5,018,405 | 5/1991 | Chiu | 16/111 R |

Primary Examiner—Randolph A. Reese
Assistant Examiner—Spencer Warnick
Attorney, Agent, or Firm—Leon Gilden

[57] ABSTRACT

An arcuate "L" shaped handle is selectively mounted to a plurality of planar blade members to define a narrow longitudinal profile defined by the handle and blade organization. A forward terminal end of the handle includes a diametrically projecting fastener selectively securable to the associated blade. A modification of the invention includes the handle formed with a central reservoir and apertures directed therethrough, with a selective fluid impermeable sleeve or a fluid permeable sleeve securable about an exterior surface of the handle coextensively positioned over the apertures to permit flow of lotion through the permeable handle.

4 Claims, 4 Drawing Sheets

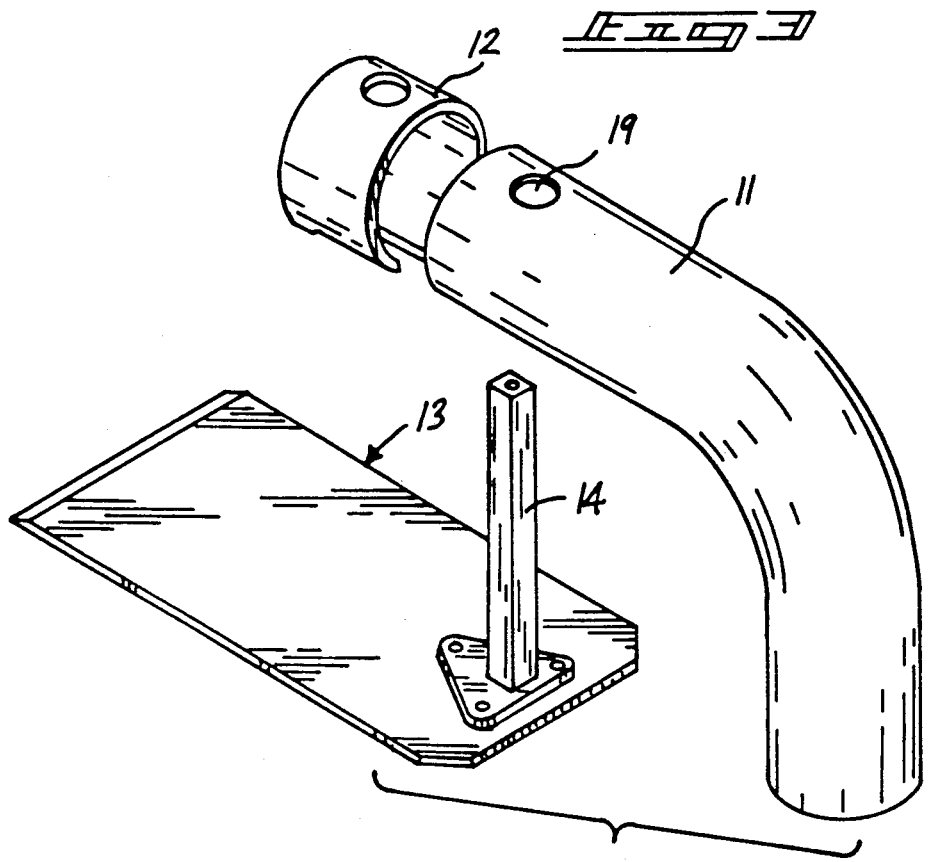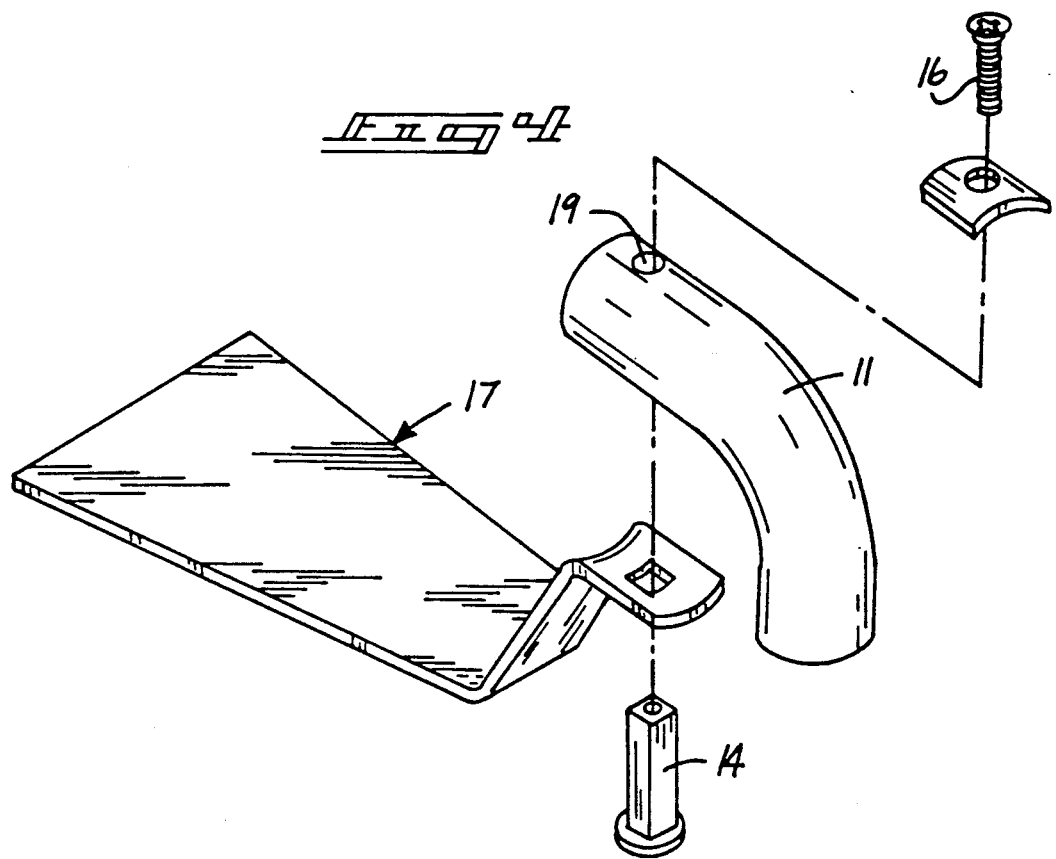

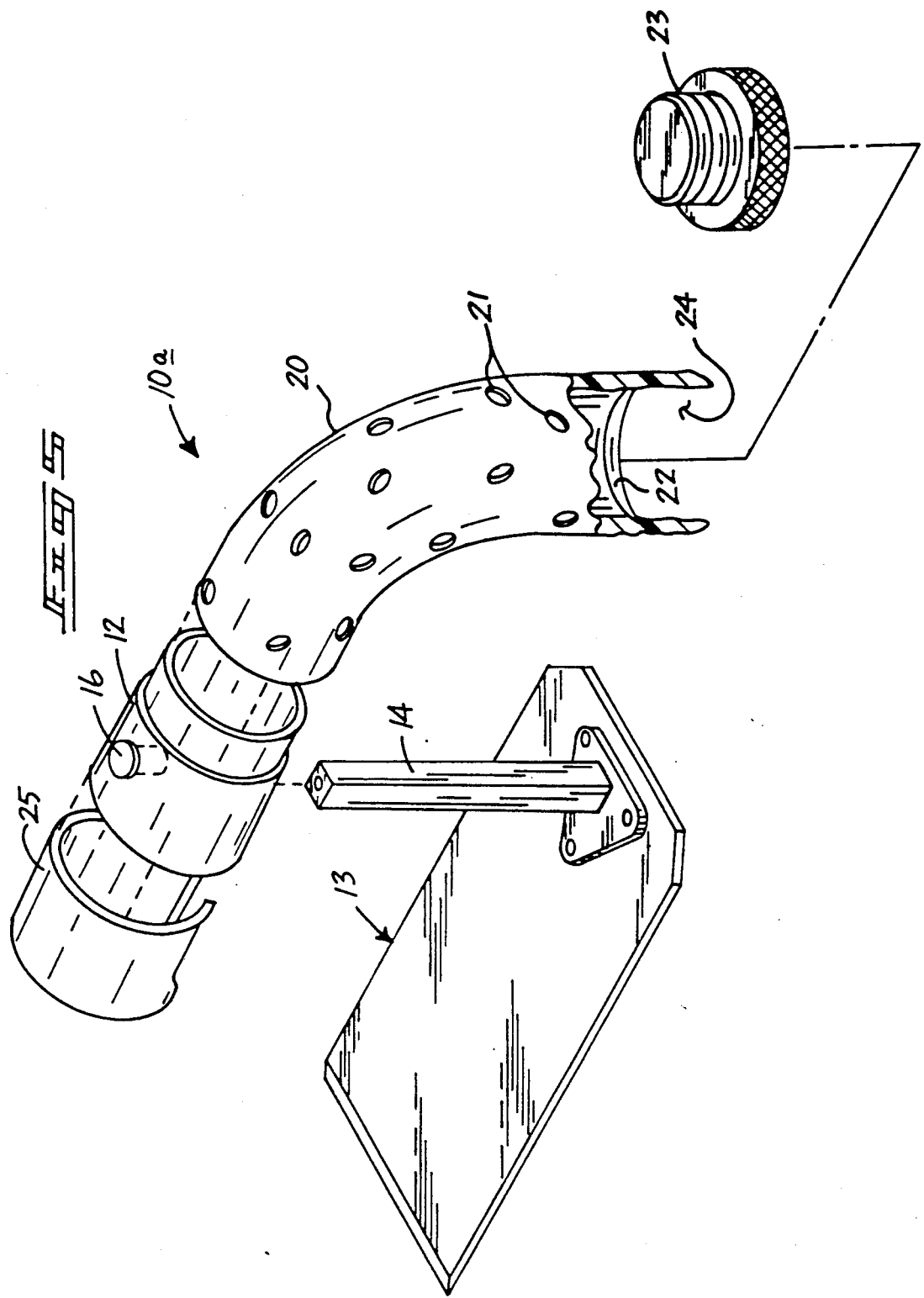

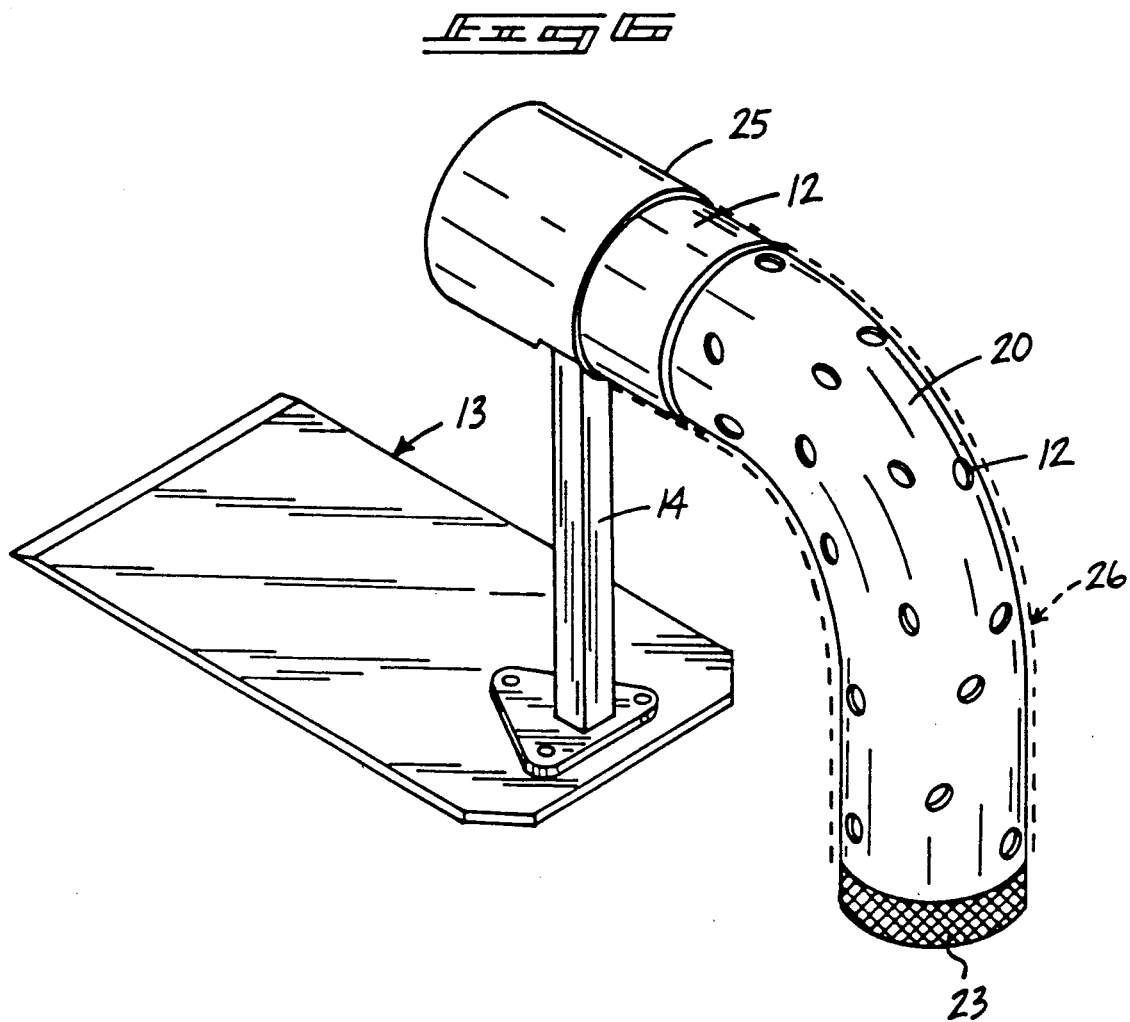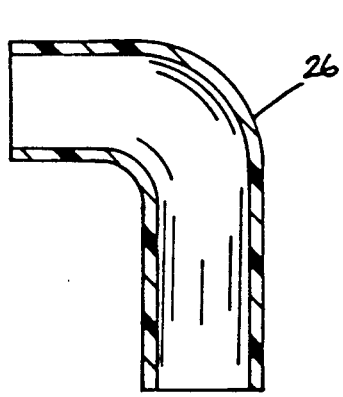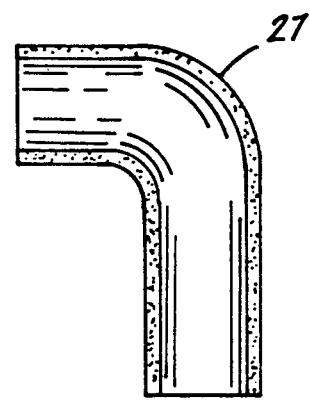

GARDEN TROWEL TOOL KIT

BACKGROUND OF THE INVENTION

1. Field of the Invention

The field of invention relates to garden tools, and more particularly pertains to a new and improved garden trowel tool kit wherein the same is arranged for providing a garden trowel of limited profile for use by an individual.

2. Description of the Prior Art

Various garden tools of various configurations are utilized in specialized orientations relative to gardening and the like, wherein the invention includes a garden trowel structure formed with a forward edge orthogonally oriented relative to the longitudinal axis of the blade and handle. Examples of prior art tool apparatus is exemplified in U.S. Pat. No. 3,608,944 to Turner wherein a trowel is characterized by an elongate blade of uniform lateral width.

U.S. Pat. No. 2,800,013 to Cesar sets forth a handle connection for securement to a blade structure permitting releasable securement of the handle to the blade.

U.S. Pat. No. 3,376,798 to Bodine sets forth a trail structure, wherein a planar blade is arranged generally parallel to an elongate handle.

U.S. Pat. No. 4,884,312 to Clark sets forth a hand trowel including a tubular handle formed as a storage compartment.

U.S. Pat. No. 2,594,878 to Davis sets forth a handle connection utilizing a pivoted link structure for securement of the handle to an associated blade structure.

As such, it may be appreciated that there continues to be a need for a new and improved garden trowel tool kit as set forth by the instant invention which addresses both the problems of ease of use as well as effectiveness in construction in providing assemblage permitting selective mounting of blade structure to an associated handle and in this respect, the present invention substantially fulfills this need.

SUMMARY OF THE INVENTION

In view of the foregoing disadvantages inherent in the known types of garden tool apparatus now present in the prior art, the present invention provides a garden trowel tool kit wherein the same utilizes a narrow profile defined by an arcuate handle mounted to an underlying blade. As such, the general purpose of the present invention, which will be described subsequently in greater detail, is to provide a new and improved garden trowel tool kit which has all the advantages of the prior art garden tool apparatus and none of the disadvantages.

To attain this, the present invention provides an arcuate "L" shaped handle selectively mounted to a plurality of planar blade members to define a narrow longitudinal profile defined by the handle and blade organization. A forward terminal end of the handle includes a diametrically projecting fastener selectively securable to the associated blade. A modification of the invention includes the handle formed with a central reservoir and apertures directed therethrough, with a selective fluid impermeable sleeve or a fluid permeable sleeve securable about an exterior surface of the handle coextensively positioned over the apertures to permit flow of lotion through the permeable handle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved garden trowel tool kit which may be easily and efficiently manufactured and marketed.

It is a further object of the present invention to provide a new and improved garden trowel tool kit which is of a durable and reliable construction.

An even further object of the present invention is to provide a new and improved garden trowel tool kit which is susceptible of a low cost of manufacture with regard to both materials and labor, and which accordingly is then susceptible of low prices of sale to the consuming public, thereby making such garden trowel tool kits economically available to the buying public.

Still yet another object of the present invention is to provide a new and improved garden trowel tool kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded isometric illustration of the tool kit, as set forth in FIG. 1.

FIG. 4 is an isometric exploded illustration of the tool organization as set forth in FIG. 2.

FIG. 5 is an isometric illustration of a modified aspect of the instant invention.

FIG. 6 is an isometric illustration of the modified organization in an assembled configuration.

FIGS. 7 and 8 are orthographic cross-sectional illustrations of replaceable sleeves for securement relative to the handle structure of the organization, as set forth in FIGS. 5 and 6.

DESCRIPTION OF THE PREFERRED EMBODIMENT

Figure 1:
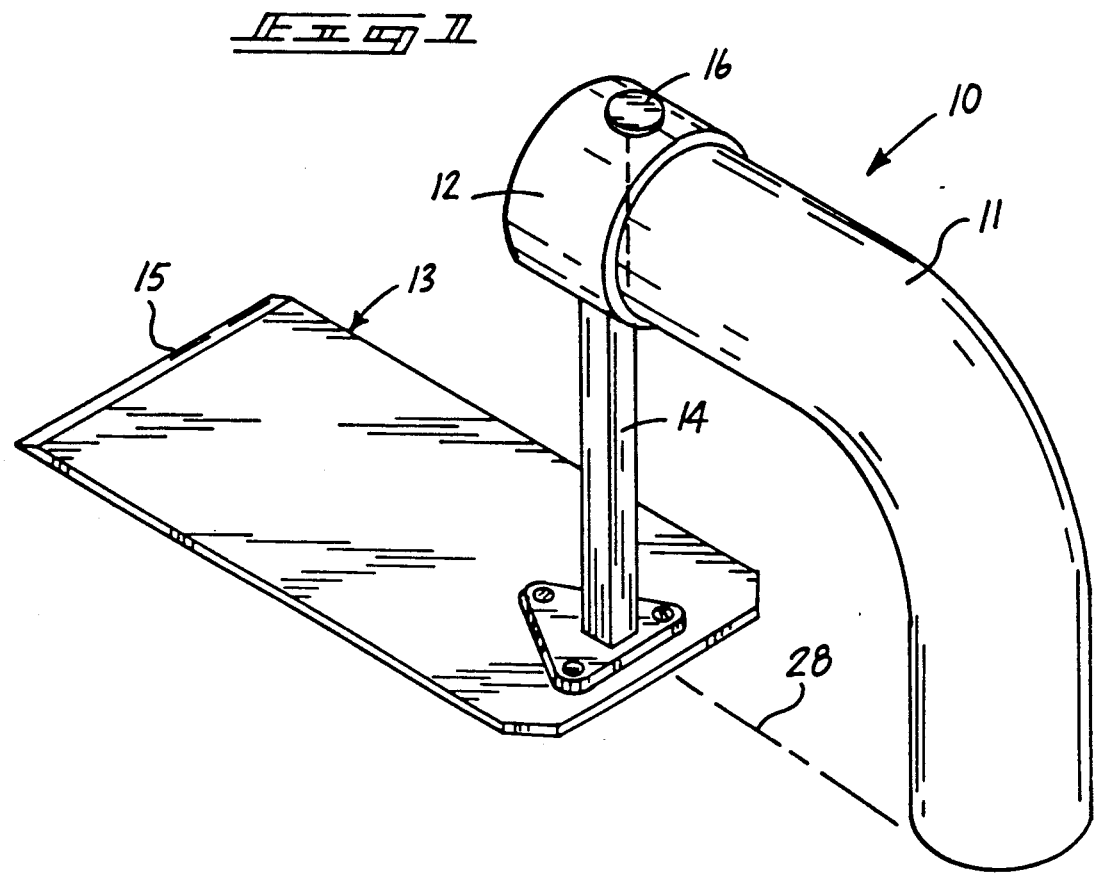
FIG. 1 is an isometric illustration of the instant invention.

With reference now to the drawings, and in particular to FIGS. 1 to 8 thereof, a new and improved garden trowel tool kit embodying the principles and concepts of the present invention and generally designated by the reference numerals 10 and 10a will be described.

More specifically, the garden trowel tool kit 10 of the instant invention essentially comprises an arcuate "L" shaped handle 11 longitudinally aligned with a planar blade 13. The planar blade 13 includes a mounting post 14 orthogonally directed adjacent a forward terminal end of the handle 11 directing the post through a fastener receiving bore 19 to receive an associated fastener 16 within a threaded bore coaxially aligned within the mounting post. A mounting ring 12 provides reinforcement in the securement of the post relative to the ring structure. The planar blade 13 includes a forward cutting edge 15 that is orthogonally oriented relative to the longitudinal tool axis 28 that aligns the handle relative to the blade structure. In the embodiment of FIG. 1, the lower terminal end of the handle 11 is in planar alignment with the blade 13.

Figure 2:
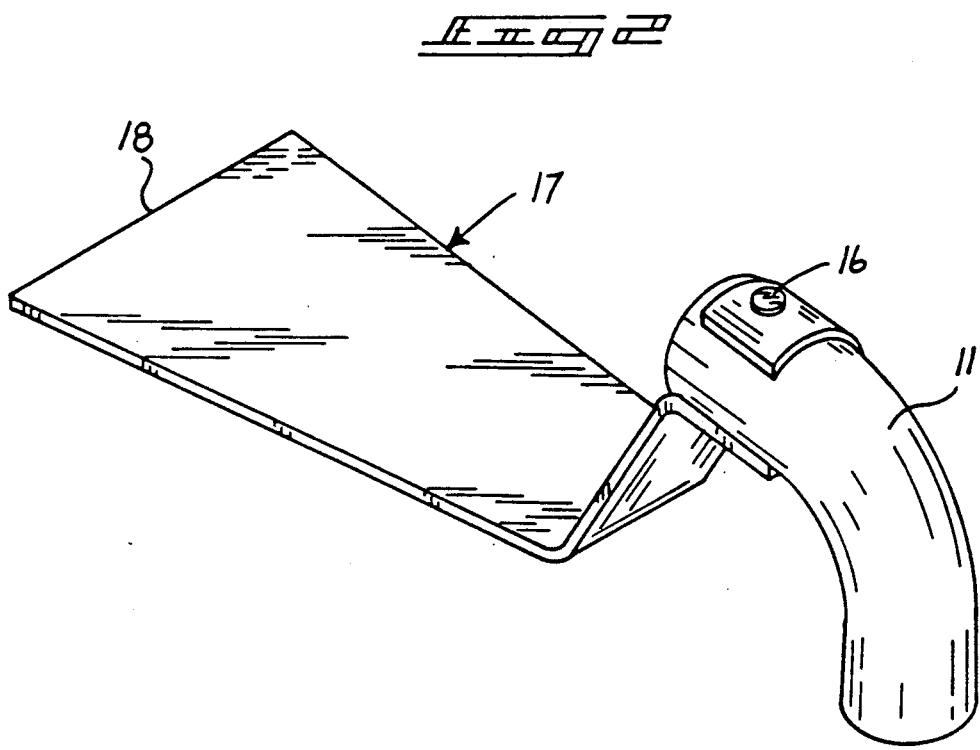
FIG. 2 is an isometric illustration of a further configuration of the instant invention.

FIG. 2 illustrates the use of a second planar blade 17 selectively securable to the handle 11, wherein the second planar blade 17 includes a forward second blade edge 18, also orthogonally oriented relative to the axis 28. The second blade structure 17 tilts downwardly relative to the handle and is of a generally trapezoidal configuration, with the second blade edge 18 of a greater length than a parallel rear edge that includes an upwardly projecting "L" shaped flange mounting to the forward terminal end of the handle 11, as illustrated. In this manner, the second edge 18 is in general planar alignment with the lower terminal end of the handle 11. The generally "L" shaped handle is positioned rearwardly and in alignment with a support post structure as illustrated and provides enhanced application of force to the associated blade structure in a gardening operation while maintaining a narrow profile for permitting use of the device in portions of a garden area of a limited operating room.

The modification of the invention as set forth in FIGS. 5–8 sets forth the use of a modified "L" shaped handle 20 aligned relative to the blade 13, in a manner as set forth in the description of FIGS. 1 and 3. In addition to the mounting ring 12, a clamping ring 25 formed of a discontinuous circumferential configuration is provided for positioning over the forward terminal end of the handle, including the mounting ring 12 to receive the upper terminal end of the mounting post 14 within the discontinuity. The handle 20 includes a matrix of apertures 21 directed through the tubular wall of the handle, with an internally threaded handle lower terminal end 22 threadedly receiving an externally threaded plug 23 to define a reservoir 24 coextensive with the handle 20 defined interiorly thereof. A plurality of "L" shaped covering sleeves defined by a first and second "L" shaped covering sleeve 26 and 27 are provided. The first sleeve 26 is formed of a fluid impermeable material 26 defining an interior configuration complementary to that defined by an exterior configuration of the handle 20. The second sleeve 27 is formed of a fluid permeable sponge-like material permitting passage of fluid contained within the reservoir 24 directed therethrough. In this manner, various hand lotions and the like are provided permitting their seepage through the seconds sleeve 27 for minimizing calluses and the like that are typically formed on an individual's hand during continuous use of a tool in a gardening procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A garden trowel tool kit, comprising in combination,
    an arcuate "L" shaped handle, the handle including a mounting ring fixedly secured to the handle at a forward terminal end of the handle, and
    a mounting post diametrically directed through the forward terminal end of the handle and the mounting ring, and
    the mounting post including a mounting post lower terminal end, and
    a planar blade mounted in an orthogonal and fixed relationship relative to the mounting post lower terminal end, the planar blade including a forward cutting edge, the forward cutting edge orthogonally oriented relative to a longitudinal axis defined by the planar blade, and
    the handle including a handle lower terminal end, wherein the handle lower terminal end is in planar alignment with the planar blade.

2. An apparatus as set forth in claim 1 wherein the handle includes a matrix of apertures directed therethrough, and the handle includes a plug member selectively securable relative to the handle lower terminal end defining a reservoir coextensively directed through the handle in communication with the apertures for receiving a fluid hand lotion within the reservoir.

3. An apparatus as set forth in claim 2 including a plurality of "L" shaped flexible covering sleeves selectively securable coextensively to an exterior surface of the handle, and a first sleeve of the plurality of covering sleeves formed of a fluid impermeable material permitting fluid flow through the apertures, and a second sleeve of a plurality of covering sleeves formed of a fluid permeable sponge-like material permitting seepage of the fluid through the apertures and the second sleeve.

4. An apparatus as set forth in claim 3 including a clamping ring formed with a discontinuous separation, wherein the discontinuous separation receives the mounting post, and wherein the clamping ring is securable about the forward terminal end of the handle and about a forward terminal end of one of said covering sleeves for securement of one of said covering sleeves to the handle.

* * * * *